United States Patent Office 3,529,808
Patented Sept. 22, 1970

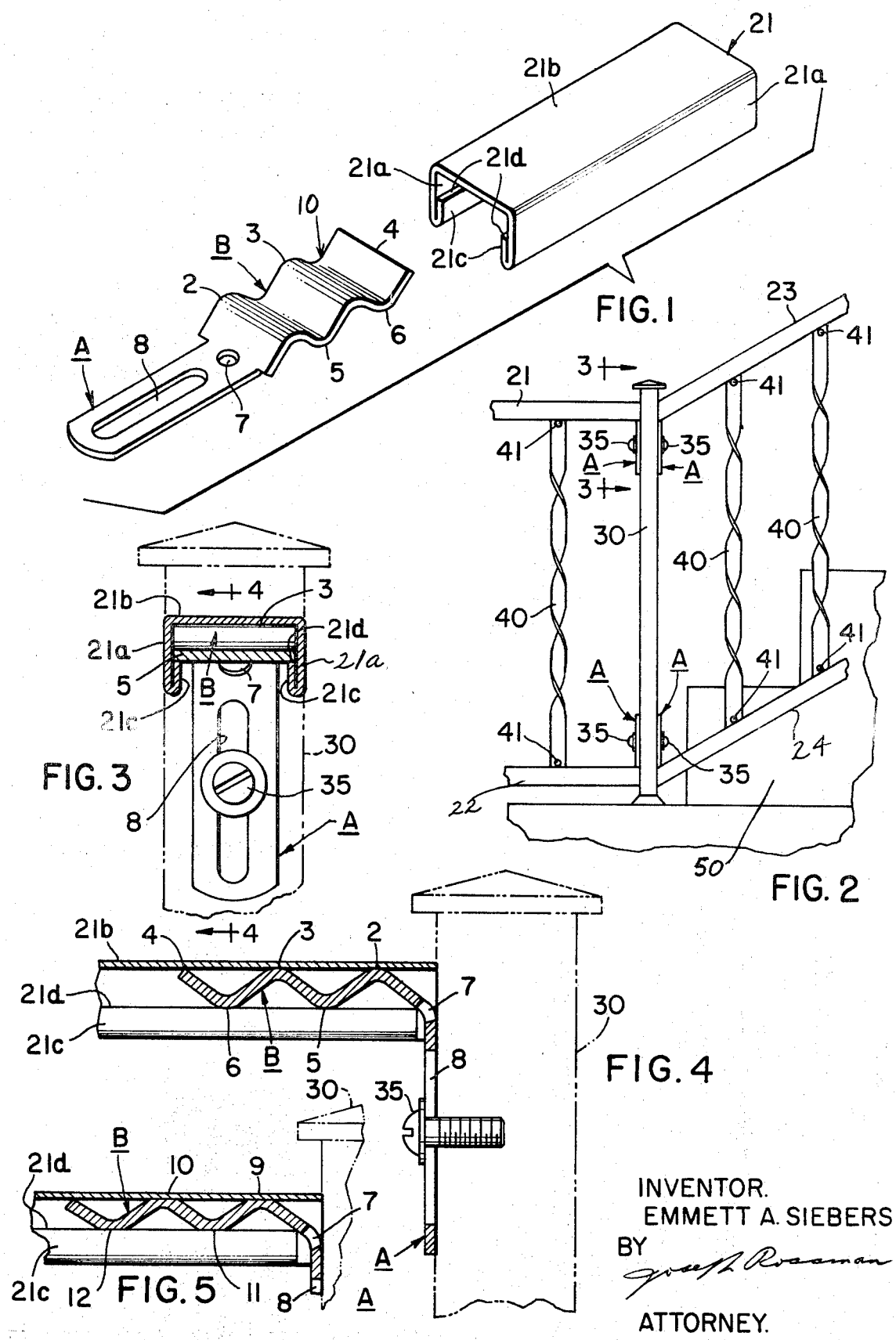

3,529,808
ADJUSTABLE RAILING ASSEMBLY
Emmett A. Siebers, Kaukauna, Wis., assignor to Kools Brothers, Inc., Appleton, Wis., a corporation of Wisconsin
Filed June 30, 1969, Ser. No. 837,508
Int. Cl. E04h 17/14
U.S. Cl. 256—65                5 Claims

ABSTRACT OF THE DISCLOSURE

The railing assembly consists of metal railing sections having top and bottom U-shaped elongate rails spaced apart in parallel relation by upright spindles. The rail sections are connected to spaced upright newel posts or other suitable supports by connector fittings which are adapted to be manually inserted in the free ends of the U-shaped railings. The leg portions of the U-shaped railings are infolded within the channel to provide longitudinally extending internal supporting shoulders which support and frictionally retain a clamping portion of the fittings. The clamping portion is corrugated in contour and is slightly expandable so as to bring the peaks of the corrugations into frictional engagement with the internal shoulder portions of the channel. The fitting is also provided with an extension which can be bent at any desired angle and attached to supporting newel posts by bolts.

SUMMARY OF THE INVENTION

This invention relates to an adjustable metal rail assembly consisting of prefabricated rail sections retained on spaced upright newel posts by means of connector fittings having a novel construction. The rail sections consist of upper and lower elongate channels generally U-shaped in cross-section spaced part by upright spaced spindles attached to the channels. The connector fitting comprises an elongate clamping plate and an integral fastening plate. The leg portions of the U-shaped railing are infolded within the channel to form supporting shoulders extending longitudinally along the entire length of the sides of the railing. The clamping plate of the connector fitting is adapted to be manually inserted in the free end of the channel rail and to be frictionally retained therein without using any bolts or other fastening means.

The clamping portion of the connector fitting is provided with a plurality of spaced corrugations extending transversely thereof and for the full width thereof. The depth of the spaced corrugations is suitably dimensioned so that the alternate peaks of the corrugations abut and are in frictional contact with the supporting portions of the infolded leg portions of the channel railing while the intermediate peaks abut and are in frictional contact with the inner face of the base of the channel. The peaks of the corrugations may be slightly flattened in order to increase their frictional contact with the abutting portions of the channel railing. The corrugated clamping portion of the fitting is also slightly expandable or yieldable under transverse pressure when it is inserted in the free end of the channel. The fitting is also provided with an integral elongate extension which serves as a fastening plate or retaining means for attaching the fitting to a suitable fixed supporting newel post or other suitable support. The fastening plate can be bent at a suitable angle for retaining the channel railing in a horizontal or any desired angular position such as on a stairway. The portion of the fitting connecting the clamping plate and the fastening plate may be weakened such as by perforating this portion with a hole in order to facilitate bending of the fastening plate at a desired angle to the clamping plate. When railings are positioned on stairways it is necessary to retain the railing sections at an angle parallel to the inclination of the stairway. The fastening plate of the fitting made according to this invention permits adjustment of the inclination of the railing sections.

Previously available retaining means for channel railings are not convenient to install and require the use of bolts or other separate fastening means which entail time and labor for fastening them in the ends of the channel railings.

The present invention provides a simplified construction which is easy to insert in the end of the channel member in secure position by simply forcing it into position with a sharp hammer blow at the site where the railing is being installed.

BRIEF DESCRIPTION OF DRAWING

Other advantages and details of the invention will be apparent from the accompanying drawing wherein, FIG. 1 is perspective view of a connector fitting and a portion of a U-shaped railing in unassembled position, FIG. 2 is a fragmental elevational view of a railing assembly using the connector fittings shown in FIG. 1, FIG. 3 is an enlarged fragmental sectional view taken on line 3—3 of FIG. 2, FIG. 4 is an enlarged fragmental longitudinal sectional view taken on line 4—4 of FIG. 3, and FIG. 5 is an enlarged fragmental longitudinal sectional view showing a modified construction of the connector fitting.

DESCRIPTION OF PREFERRED EMBODIMENTS

Referring to FIG. 2 of the drawing, a metal railing assembly is illustrated, partially broken away, wherein there is shown a horizontally positioned prefabricated rail section consisting of upper channel rail 21 and a lower spaced channel rail 22 connected by a plurality of vertically positioned ornamental spindles 40. This rail section is attached to the upright newel post 30 by bolts 35 passing through fastening plates "A" of the connector fittings, generally indicated by numeral 10 in FIG. 1. As shown in FIG. 1, the connector fitting 10 consists of a fastening plate portion "A" and a clamping plate portion "B." The ends of both the upper 21 and lower channel 22 are provided with a connector fitting 10 which will be described in greater detail. The newel post 30 also serves to support another prefabricated rail section on a stairway 50 consisting of upper channel 23 and lower channel 24 connected by spaced vertically positioned ornamental spindles 40. The ends of the upper channel 23 and lower channel 24 are each provided with a connector fitting 10 having an integral fastening plate "A" bent at a suitable angle to the newel post 30 so as to permit bolts 35 to pass through slots 8 in the plate to attach the channels to the newel post. The spindles 40 are preferably provided at their ends with holes 41 so as to facilitate bending the ends of the spindles attached to the channel as disclosed in Kools Pat. 2,715,513, Aug. 15, 1955, when the rail channels are positioned at an angle on a stairway. The ends of the spindles 40 are attached to the inner channel surface or base of the rails preferably by welding.

Details of the connector fitting 10 construction are shown in FIG. 1. The fitting consists of a flat fastening plate portion "A" and an integrally connected clamping plate "B." The fastening plate "A" is provided with a weakened area such as an opening or hole 7 of suitable size so as to facilitate transverse bending of the fastening plate at any desired angle in relation to the clamping plate "B." For example, when the fitting is used to attach a pre-formed rail section in horizontal position, as shown at the left in FIG. 2, the fastening plate "A" is bent at right angles. When the prefabricated rail section, shown at the right of FIG. 2, is positioned on a stairway 50 at an angle parallel to the stairway inclination the fastening plate "A" of the fittting 10 is bent at a suitable angle to permit attachment of the rail section to the newel post 30 at an inclined position. The fastening plate is provided with a suitably dimensioned opening or slot 8 through which a threaded bolt 35 can be passed for fastening the plate to the newel 30 provided with a suitably threaded opening to receive the bolt. Other suitable attaching means may be used such as a U-shaped apertured clip embracing the fastening plae and retained by a threaded bolt passing through the newel.

The clamping plate "B" the fitting is of a width so as to be insertable at the end of a channel rail and to extend between the iner surfaces of the leg portion 21a as shown in FIG. 3. It is also shaped into a plurality of spaced transverse corrugations having spaced alternate upper peaks 2 and 3, and spaced lower peaks 5 and 6. The depth of the spaced peaks is dimensioned so that the peaks 5 and 6 are adapted to abut and frictionally engage supporting shoulders 21d of the channel 21 in the relation shown in FIGS. 3 and 4 when the clamping plate "B" is manually inserted and forced within the free end of the channel 21 which is generally U-shaped in cross section. As shown in FIG. 1, the channel 21 consists of a flat base 21b and opposed right angular leg portions 21a. The longitudinally extending edge portions 21c of the leg portions are infolded within the channel and in face contact with the inner face of the leg portions and extend short of the base portion 21b so as to provide opposed continuous longitudinally extending supporting shoulders 21d within the channel.

The width and dimensions of the clamping plate "B" are proportioned so that when it is forced or pushed into the free end of channel 21, the peaks 5 and 6 will be supported on the shoulders 21d and frictionally retained, as shown in FIGS. 3 and 4, and the alternate peaks 2, 3 and 4 will be brought into contact and in frictional engagement with the inner face of the base 21b of the channel 21. The corrugated clamping plate is also slightly expandable or yieldable when transverse pressure is exerted when it is inserted manually within the free end of the channel.

No special tools are required to install the fitting 10 within the free ends of the channels except standard hand tools, such as a hammer for forcing the clamping plate portion of the fitting within the channel and a pliers or crescent wrench to bend the fastening plate at a desired angle for proper installation. When the clamping plate "B" is forced within the channel end the pressure of the channel base 21b against the abutting peaks 2, 3 and 4 of the corrugations causes the clamping plate to slightly expand longitudinally thereby forcing the alternate peaks 5 and 6 abutting the inner supporting shoulder portions 21d of the chhannel into frictional engagement under sufficient stress and holding power so as not to require use of retaining bolts, but forceable removal of the fitting from the channel in case of mistakes or disassembly of the railing sections is required.

If desired the exposed peaks of the corrugation of the clamping plate may be slightly flattened at 9, 10, 11 and 12 as shown in FIG. 5 to provide greater frictional engagement with the adjacent surface of the channel. If desired instead of infolding the leg portions of the channel rail to provide supporting shoulders as previously described, the opposed leg portions may be shaped so as to have integral continuous shoulders or beaded portions extending longitudinally within the channel of the rail at a suitable distance from the base of the channel to frictionally engage the clamping plate as previously described.

I claim:
1. A railing assembly adapted to be secured to a fixed support, comprising an elongate channel railing section of generally U-shaped cross-section and having a base portion and opposed leg portions; opposed longitudinally extending support means carried by the internal surfaces of said leg portions spaced above the base portion of said railing, a connector fittting adapted to be inserted and frictionally retained between said leg portions at one end of said channel railing, said connector fitting consisting of an elongate clamping plate and a fastening plate integral within, said clamping plate having a plurality of corrugations extending transversely of its longitudinal axis, alternate peaks of said corrugations being in frictional engagement with said longitudinally extending supporting means and the intermediate peaks being in frictional engagement with the inner face of the base portion of said channel railing, said fastening plate being bent at an angle to said clamping plate and having an opening therein to receive a bolt therethrough carried by the said fixed support.

2. A railing assembly as defined in claim 1 comprising spaced top and bottom parallel channel rail sections of generally U-shaped cross section connected by a plurality of spaced spindles having their ends connected to said top and bottom channel rails and being disposed vertically and in parallel relation to each other.

3. A railing assembly as defined in claim 1 wherein the connector fitting is provided with a weakened portion connecting the clamping plate and fastening plate to facilitate bending of the fastening plate at a suitable angle.

4. A railing assembly as defined in claim 1 wherein the peaks of the corrugations of the clamping plate are flattened to increase their frictional bearing surface with adjacent portions of the channel railing.

5. A railing assembly adapted to be secured to a fixed support comprising an elongate railing section of generally U-shaped cross section having a base portion and opposed leg portions forming a longitudinally extending internal channel, the longitudinally extending edge portions of the leg portions being infolded within said channel and in face contact with the inner faces of said leg portions and extending short of said base portion to provide continuous longitudinally extending supporting shoulders, a connector fitting consisting of an elongate clamping plate and a fastening plate integral therewith functionally retained in one end of said railing section by said clamping plate, said clamping plate having a plurality of corrugations extending transversely of the longitudinal axis of said clamping plate, alternate peaks of said corrugations being in frictional engagement with said supporting shoulders and the intermediate peaks being in frictional contact with the inner face of the base of the channel, said fastening plate being bent at an angle to said clamping plate and having an opening therein for re-receiving a bolt therethrough, said bolt being secured to said fixed support.

References Cited

UNITED STATES PATENTS

| 2,771,276 | 11/1956 | Constance et al. | 256—22 |
| 3,343,811 | 9/1967 | Kusel et al. | 256—65 X |
| 3,352,084 | 11/1967 | Seerg | 256—65 X |
| 3,353,853 | 11/1967 | Heywood | 256—65 X |
| 3,356,403 | 12/1967 | Sak et al. | 287—189.36 |

DENNIS L. TAYLOR, Primary Examiner

U.S. Cl. X.R.

256—22; 287—189.36